(12) United States Patent
You et al.

(10) Patent No.: US 8,144,302 B2
(45) Date of Patent: Mar. 27, 2012

(54) DISPLAY SUBSTRATE AND METHOD FOR MANUFACTURING THE SAME

(75) Inventors: Chun-Gi You, Hwaseong-si (KR); Se-Il Cho, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1013 days.

(21) Appl. No.: 11/954,576

(22) Filed: Dec. 12, 2007

(65) Prior Publication Data

US 2008/0191981 A1    Aug. 14, 2008

(30) Foreign Application Priority Data

Feb. 8, 2007   (KR) .............................. 10-2007-13332

(51) Int. Cl.
*G02F 1/1333* (2006.01)
*G02F 1/1343* (2006.01)
*G09G 3/36* (2006.01)
(52) U.S. Cl. ........... 349/158; 349/143; 349/144; 345/87
(58) Field of Classification Search .................. 349/158, 349/143, 144; 345/87
See application file for complete search history.

(56) References Cited

U.S. PATENT DOCUMENTS

| | | | | |
|---|---|---|---|---|
| 6,710,836 B2* | 3/2004 | Lee | ............................... | 349/141 |
| 6,795,151 B2* | 9/2004 | Lee | ............................... | 349/141 |
| 6,924,864 B2* | 8/2005 | Kim | ............................... | 349/141 |
| 7,576,821 B2* | 8/2009 | Lee et al. | ............................... | 349/141 |
| 7,623,191 B2* | 11/2009 | Liao et al. | ........................ | 349/40 |
| 2009/0020758 A1* | 1/2009 | Lee et al. | .......................... | 257/59 |
| 2009/0201455 A1* | 8/2009 | Murai | ............................ | 349/139 |

FOREIGN PATENT DOCUMENTS

| | | | |
|---|---|---|---|
| JP | 2002-090781 | | 3/2002 |
| JP | 2002090781 A | * | 3/2002 |
| JP | 2005-338264 | | 12/2005 |
| KR | 1020020002054 | | 1/2002 |

* cited by examiner

Primary Examiner — Mike Qi
(74) Attorney, Agent, or Firm — F. Chau & Associates, LLC

(57) ABSTRACT

A display substrate includes a first metal pattern including a gate line and a signal line, a first insulation layer formed on a substrate where the first metal pattern is formed, a first electrode formed on the first insulation layer, and a second metal pattern including a connecting electrode and a data line. The first insulation layer includes a first opening portion exposing a portion of the signal line. The first electrode corresponds to a unit pixel. The connecting electrode is connected to the first electrode and the signal line through the first opening portion.

32 Claims, 9 Drawing Sheets

DISPLAY SUBSTRATE AND METHOD FOR MANUFACTURING THE SAME

CROSS-REFERENCE TO RELATED APPLICATION

The present application claims priority under 35 U.S.C. §119 to Korean Patent Application No. 2007-013332, filed on Feb. 8, 2007, the disclosure of which is incorporated herein by reference in its entirety.

BACKGROUND OF THE INVENTION

1. Technical Field

The present disclosure relates to a display substrate and a method for manufacturing the display substrate, and more particularly, to a display substrate capable of simplifying manufacturing processes.

2. Discussion of the Related Art

Liquid crystal modes including an in-plane switching (IPS) mode and a fringe field switching (FFS) mode are used to improve a viewing angle of a liquid crystal display (LCD) panel. The IPS mode uses an electric field generated in a parallel direction with respect to a substrate. The FFS mode uses an electric field generated in a slanted direction with respect to the substrate. The FFS mode uses birefringence generated by liquid crystal molecules.

The FFS mode LCD panel includes a display substrate, a countering substrate and a liquid crystal layer interposed between the display substrate and the countering substrate. The display substrate includes a plurality of gate lines, a plurality of data lines and a plurality of pixels. A first electrode and a second electrode are formed in each of the pixels. An insulation layer is formed between the first electrode and the second electrode. A common voltage is applied to the first electrode, and a pixel voltage is applied to the second electrode. The FFS mode LCD panel further includes a first line parallel with the data line, and a plurality of second lines parallel with the gate line and connected to the first line. Decreasing the number of masks in a manufacturing process for the FFS mode LCD panel can reduce manufacturing costs.

SUMMARY OF THE INVENTION

Exemplary embodiments of the present invention provide a display substrate capable of decreasing manufacturing costs and a method for manufacturing the display substrate.

According to an exemplary embodiment of the present invention, a display substrate includes a first metal pattern including a gate line and a signal line, a first insulation layer formed on a substrate where the first metal pattern is formed, a first electrode formed on the first insulation layer and a second metal pattern including a connecting electrode and a data line. The first insulation layer may include a first opening portion exposing a portion of the signal line. The first electrode may correspond to a unit pixel. The connecting electrode can be connected to the first electrode and the signal line through the first opening portion. The first electrode may include a transparent conductive material.

The display substrate may further include a second insulation layer formed on the substrate where the second metal pattern is formed and a second electrode formed on the second insulation layer. The second electrode may correspond to the unit pixel.

The second electrode can generate a fringe field with the first electrode.

The second electrode may include a transparent conductive material.

The display substrate may further include a thin film transistor (TFT) formed in the unit pixel. The TFT may include a gate electrode protruded from the gate line, a source electrode protruded from the data line, the source electrode overlapping a portion of the gate electrode, a drain electrode spaced apart from the source electrode, the drain electrode including the second metal pattern, and an active layer formed between the second metal pattern and the first insulation layer, wherein the active layer overlaps the gate electrode.

The second insulation layer may include a contact hole exposing an end portion of the drain electrode. The second electrode can be connected to the drain electrode through the contact hole.

A display substrate may include a first metal pattern including a gate line and a signal line, a first insulation layer formed on a substrate where the first metal pattern is formed, the first insulation layer including a first opening portion exposing a portion of the signal line, a first electrode formed on the first insulation layer and corresponding to a unit pixel, wherein the first electrode comprises a second opening portion corresponding to the first opening portion, and a second metal pattern including a connecting electrode formed on the first electrode and corresponding to the second opening portion, and a data line, wherein the connecting electrode is connected to the first electrode and the signal line.

The first electrode may include a transparent conductive material.

The display substrate may further include a second insulation layer formed on the substrate where the second metal pattern is formed and a second electrode formed on the second insulation layer. The second electrode may correspond to the unit pixel.

The second electrode may generate a fringe field with the first electrode.

The second electrode may include a transparent conductive material.

The display substrate may further include a thin film transistor (TFT) formed in the unit pixel. The TFT may include a gate electrode protruded from the gate line, a source electrode protruded from the data line, the source electrode overlapping a portion of the gate electrode, a drain electrode spaced apart from the source electrode, the drain electrode including the second metal pattern, and an active layer formed between the second metal pattern and the first insulation layer. The active layer can overlap the gate electrode.

The second insulation layer may include a contact hole exposing an end portion of the drain electrode.

The second electrode can be connected to the drain electrode through the contact hole.

According to an exemplary embodiment of the present invention, a method of manufacturing a display substrate includes forming a first metal pattern including a gate line and a signal line on a substrate, forming a first insulation layer and a conductive layer on the substrate where the first metal pattern is formed, forming an opening portion exposing a portion of the signal line in a unit pixel by etching the conductive layer and the first insulation layer, forming a first electrode corresponding to the unit pixel by etching the conductive layer where the opening portion is formed, forming a second metal pattern corresponding to the opening portion, forming a second insulation layer on the substrate where the second metal pattern is formed, and forming a second electrode formed on the second insulation layer. The second metal pattern may comprise a connecting electrode connected to the signal line and the first electrode and a data line. The second electrode may correspond to the unit pixel.

Forming the opening portion may include forming a photoresist layer on the conductive layer, forming a photoresist pattern including a first pattern portion, a second pattern portion having a thickness thinner than a thickness of the first pattern portion and an opening pattern formed by patterning the photoresist layer, and etching the conductive layer corresponding to the opening pattern and the first insulation layer by using the photoresist pattern.

Forming the first electrode may include removing the second pattern portion by etching a portion of the photoresist pattern, and etching the conductive layer including the opening area which is exposed through removing the second pattern portion.

Etching the conductive layer can be performed through a wet etching process by using an etching agent having an etching selectivity ratio of the first metal pattern.

The method of manufacturing a display substrate may further include forming a TFT in the unit pixel, wherein forming the TFT comprises, forming a gate electrode protruded from the gate line by patterning the first metal pattern, forming an active layer on the first insulation layer, the active layer overlapping the gate electrode, forming a source electrode overlapping a portion of the active layer by patterning the second metal pattern, and forming a drain electrode spaced apart from the source electrode, wherein the drain electrode overlaps a portion of the gate electrode.

The method of manufacturing a display substrate may further include etching a portion of the active layer exposed between the source electrode and the drain electrode by a predetermined distance.

The method of manufacturing a display substrate may further include forming a contact hole exposing a portion of the drain electrode by patterning the second insulation layer.

Forming the second electrode may include forming a conductive layer on the second insulation layer, and patterning the conductive layer to form the second electrode including a plurality of first lines extended in a direction which is the same as an extended direction of the data line and connected to the drain electrode through the contact hole, and a plurality of second lines extended in a direction which is same as an extended direction of the gate line and connected to the first lines.

Forming the opening portion may include forming a gate pad hole exposing a portion of the gate line.

Forming the second metal pattern may include forming a covering pattern to cover the gate pad hole.

The conductive layer may include a transparent conductive material.

The second electrode may include a transparent conductive material.

BRIEF DESCRIPTION OF THE DRAWINGS

Exemplary embodiments of the present invention can be understood in more detail from the following descriptions taken in conjunction with the accompanying drawings, in which.

DESCRIPTION OF EXEMPLARY EMBODIMENTS

The invention is described more fully hereinafter with reference to the accompanying drawings, in which exemplary embodiments of the invention are shown. This invention may, however, be embodied in many different forms and should not be construed as limited to the exemplary embodiments set forth herein.

Figure 1:
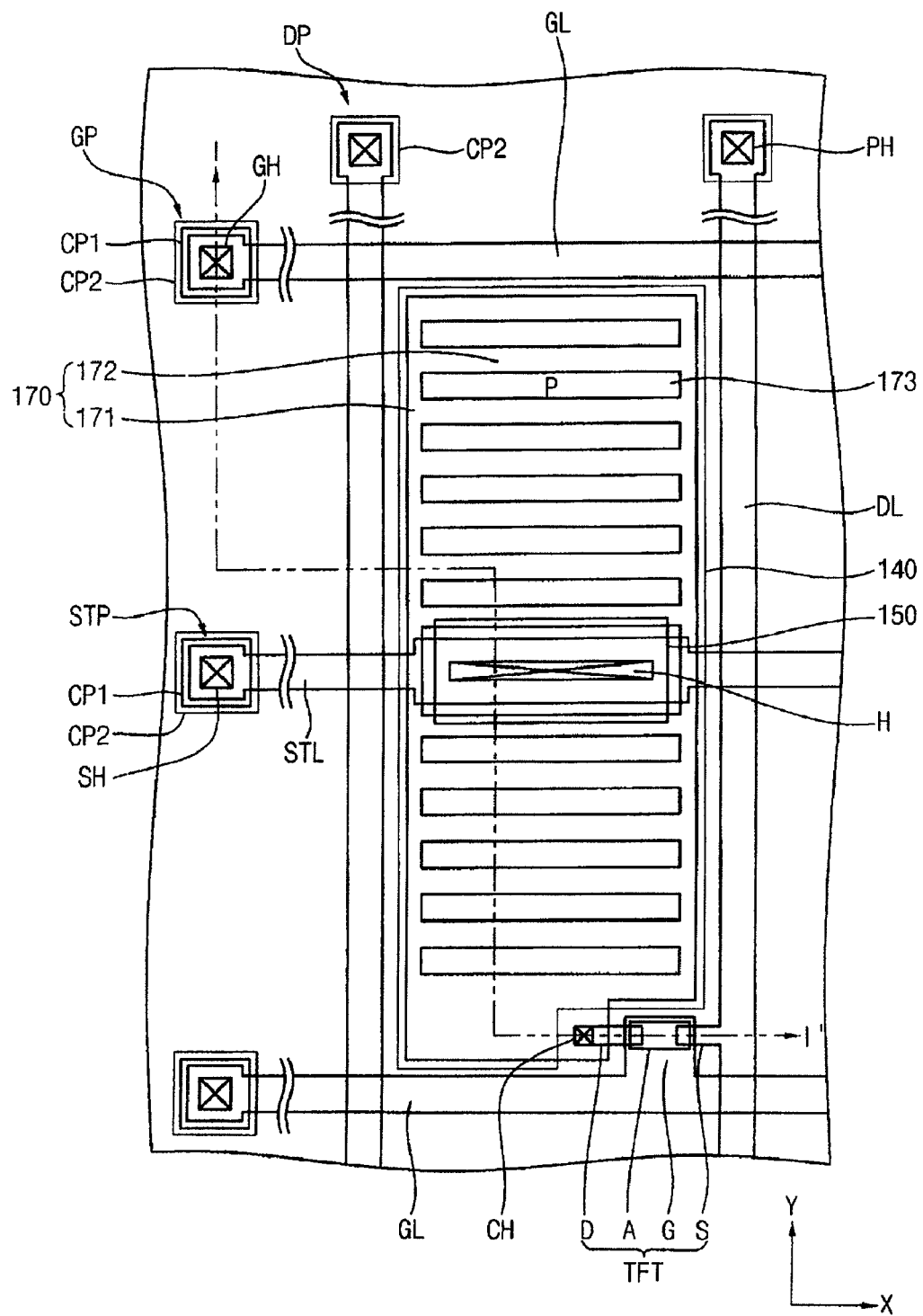
FIG. 1 is a partial plan view of a display substrate according to an exemplary embodiment of the present invention.
Figure 2:
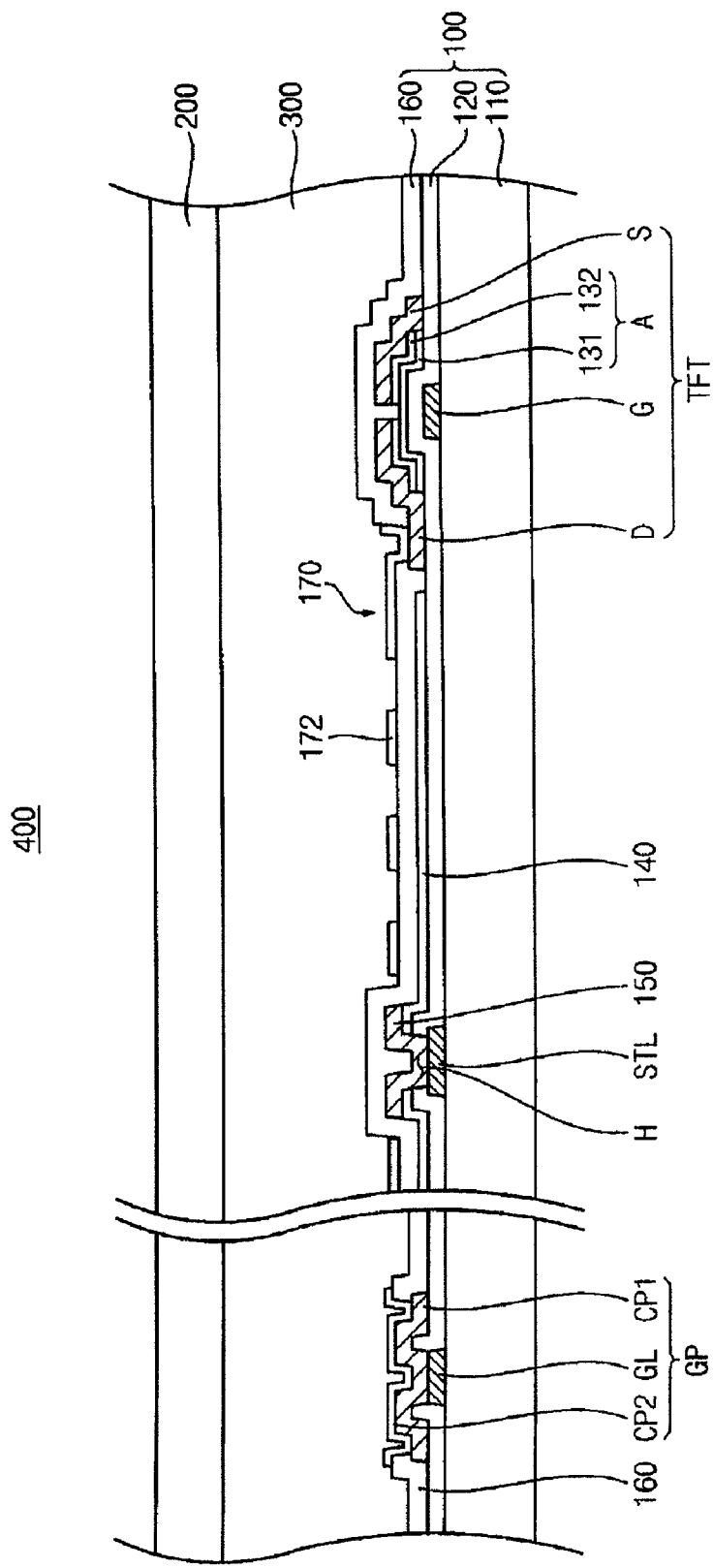
FIG. 2 is a cross-sectional view taken along the line I-I' of FIG. 1.

FIG. 1 is a partial plan view of a display substrate according to an exemplary embodiment of the present invention. FIG. 2 is a cross-sectional view taken along the line I-I' of FIG. 1.

Referring to FIGS. 1 to 2, a liquid crystal display (LCD) panel includes a display substrate 100, a countering substrate 200 and a liquid crystal layer 300 interposed between the display substrate 100 and the countering substrate 200.

The display substrate 100 includes a base substrate 110. The base substrate 110 may include, for example, a transparent material. In an exemplary embodiment, the base substrate 110 is a glass substrate. A plurality of gate lines GL extended in a first direction X, a plurality of data lines DL extended in a second direction Y crossing the first direction X, and a plurality of unit pixels P are formed on the base substrate 110. The second direction Y may be perpendicular to the first direction X.

The unit pixel P includes a thin film transistor (TFT) connected to the gate line GL and the data line DL, a signal line STL extended in the first direction X, a first electrode 140, and a second electrode 170.

A first metal pattern includes the gate lines GL and the signal line STL which can be formed by patterning the same metal layer. The signal line STL receives a common voltage generated from a driving voltage supplying part. The first metal pattern further includes a gate electrode G protruded from the gate line GL.

A gate insulation layer 120 is formed on the base substrate 110 where the first metal pattern including the gate lines GL, the gate electrode G and the signal line STL is formed. In an exemplary embodiment, the gate insulation layer 120 includes silicon nitride (SiNx).

A gate pad hole GH exposing an end portion of the gate line GL and a signal pad hole SH exposing an end portion of the signal line STL are formed in the gate insulation layer 120.

An active layer A is formed on the gate insulation layer 120. The active layer A overlaps the gate electrode G. In an exemplary embodiment, the active layer A may include a multi-layer structure which includes a semiconductor layer 131 having amorphous silicon and an ohmic contact layer 132 having amorphous silicon doped with n+ impurities.

The first electrode 140 corresponding to the unit pixel P is formed on the gate insulation layer 120. The first electrode 140 may not overlap the active layer A. In an exemplary embodiment, the first electrode 140 may include, for example, a conductive material. The conductive material may include, for example, indium zinc oxide or amorphous indium tin oxide.

A hole is formed in the first electrode 140 and the gate insulation layer 120 to expose a portion of the signal line STL formed in the unit pixel P.

A second metal pattern including data lines DL, a source electrode S, a drain electrode D, and a connecting electrode 150 is formed on the base substrate 110 where the first electrode 140 is formed.

The source electrode S protrudes from the data line DL and overlaps a portion of the active layer A. The drain electrode D is spaced apart from the source electrode S by a predetermined distance and overlaps a portion of the active layer A.

The semiconductor layer 131 is exposed between the source electrode S and the drain electrode D by removing the ohmic contact layer 132. An area where the semiconductor layer 131 is exposed may be referred to as an electrical channel of the TFT.

The TFT includes the gate electrode G, the active layer A, the source electrode S and the drain electrode D in the unit pixel P.

The first connecting electrode 150 corresponds to the hole H. In an exemplary embodiment, the first connecting electrode 150 has an area larger than an area of the hole H.

The connecting electrode 150 is connected to the signal line STL exposed by the hole H and the first electrode 140 formed adjacent the hole H. The signal line STL is electrically connected to the first electrode 140 through the connecting electrode 150 so that a common voltage is applied to the first electrode 140.

The second metal pattern may further include a first covering pattern CP1 to cover the gate pad hole GH or the signal pad hole SH.

A passivation layer 160 is formed on the base substrate 110 where the second metal pattern is formed. In an exemplary embodiment, the passivation layer 160 may include, for example, silicon nitride or silicon oxide. A contact hole CH is formed in the passivation layer 160 to expose an end portion of the drain electrode D. A plurality of pad holes PH are formed in the passivation layer 160 to expose the first covering pattern CP1 and an end portion of the data line DL. A gate pad GP, a signal pad STP and a data pad DP are formed at an end portion of the gate line GL, an end portion of the signal line STL and an end portion of data line DL by the pad hole PH, respectively.

The second electrode 170 corresponding to the unit pixel P is formed on the passivation layer 160. In an exemplary embodiment, the second electrode 170 may include, for example, a transparent conductive material. The transparent conductive material may include, for example, indium tin oxide, indium zinc oxide, or amorphous indium tin oxide.

The second electrode 170 is electrically connected to the drain electrode D through the contact hole CH, and receives a pixel voltage supplied from the data line DL.

The second electrode 170 may include a plurality of slit patterns 173 spaced apart from each other by substantially the same distance to form a fringe field with the first electrode 140. In an exemplary embodiment, the second electrode 170 may include a first line 171 extended in a third direction at the unit pixel P, and a plurality of second lines 172 protruding from the first line 171 and substantially uniformly spaced apart from each other by the slit pattern 173. The third direction may be the same as the first direction X or the second direction Y.

The second lines 172 protruding from the first line 171 may extend at a substantially right angle with respect to the first line 171. Alternatively, the second lines 172 make an acute angle or an obtuse angle with respect to the first line 171.

Since different voltages are applied to the first electrode 140 and the second electrode 170, the fringe field is generated between the first electrode 140 and the second electrode 170, thereby rearranging liquid crystal molecules of the liquid crystal layer 300 by the electric field.

Light supplied from behind the LCD panel 400 passes through the LCD panel 400 so that an image is displayed.

A second covering pattern CP2 may be formed from a same layer as the second electrode 170 on the passivation layer 160 to cover the pad holes PHs.

FIGS. 3 to 9 are cross-sectional views showing a method of manufacturing a display substrate according to an exemplary embodiment of the present invention.

Figure 3:
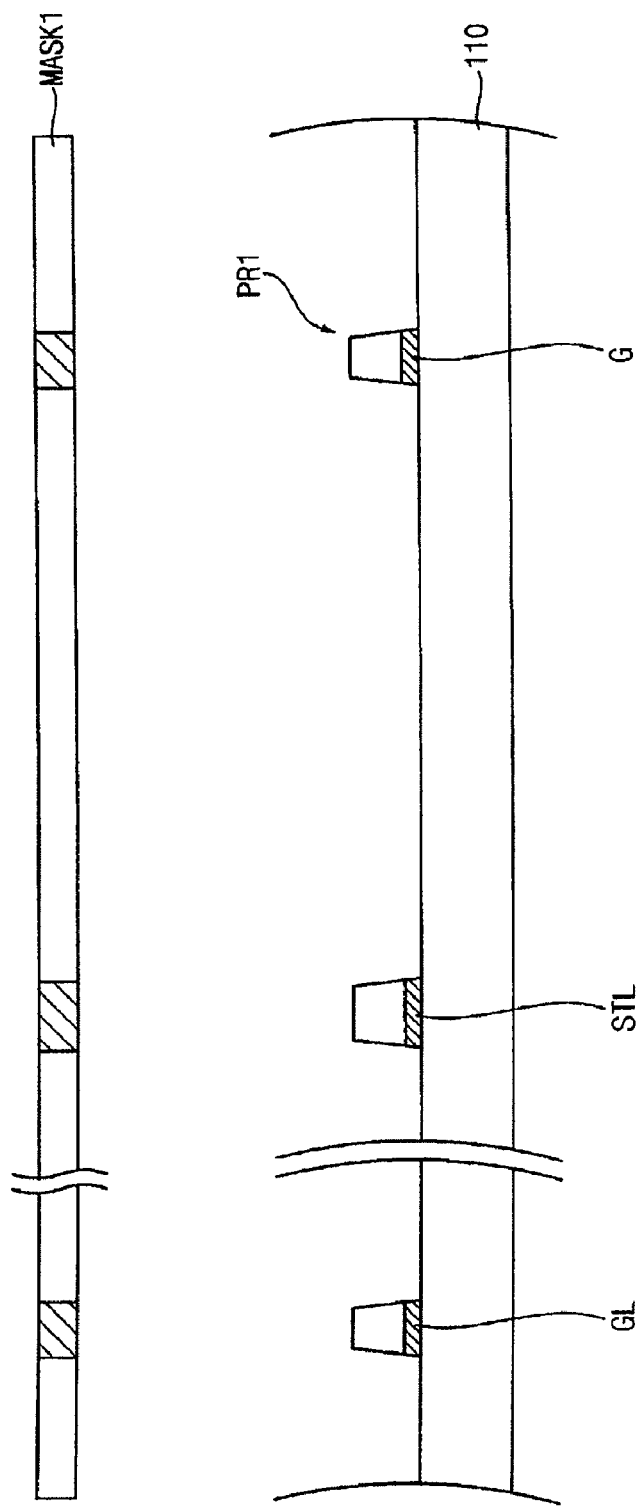
FIGS. 3 to 9 are cross-sectional views showing a method of manufacturing a display substrate according to an exemplary embodiment of the present invention.

Referring to FIGS. 1 to 3, a first metal layer (not shown) is formed on the base substrate 110. The first metal layer may include, for example, chromium, aluminum, tantalum, molybdenum, titanium, tungsten, copper or a combination thereof. The first metal layer may be deposited by a sputtering process. The first metal layer may include a multi-layer structure having physical properties different from each other. A photoresist layer is coated on the first metal layer. In an exemplary embodiment, the photoresist layer may be a positive type photoresist. An exposed area of the positive type photoresist can be dissolved by a developing agent.

A first photoresist pattern PR1 is formed by patterning the photoresist layer through a photolithography using a first mask MASK1. Then, the first metal pattern including the gate lines GL, the gate electrode G and the signal line STL is formed by patterning the first metal layer through a photolithography process by using the first photoresist pattern PR1.

The gate lines GL are extended in the first direction X on the base substrate 110. The gate electrode G is protruded from the gate lines GL. The signal line STL is extended between the gate lines GL in the first direction X.

An etching process to form the first metal pattern may be performed by a wet etching process. A stripping process can be performed to remove the photoresist pattern PR1 after the etching process was performed to form the first metal pattern.

Figure 4:
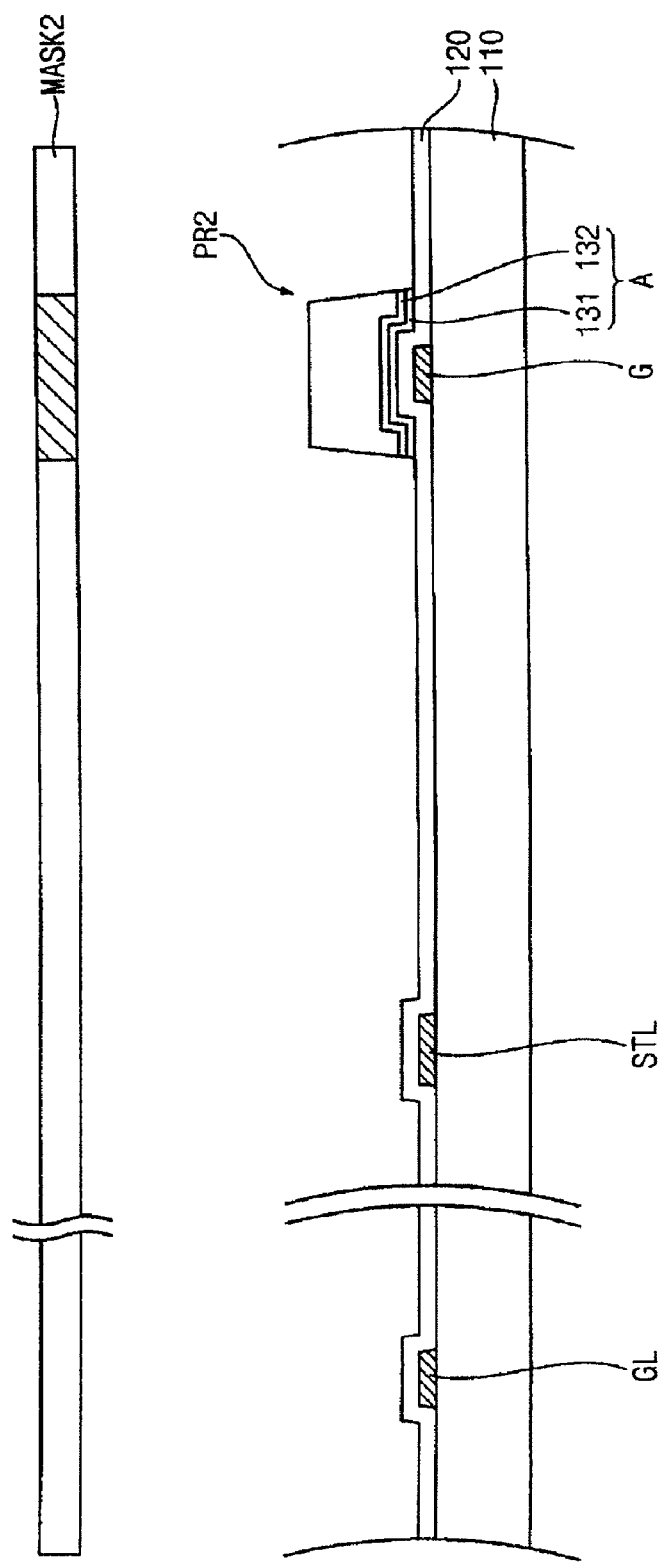

Referring to FIG. 4, the gate insulation layer 120 is formed on the base substrate 110 where the first metal pattern is formed through a chemical vapor deposition process. The gate insulation layer 120 may include, for example, silicon nitride (SiNx) or silicon oxide (SiOx). The gate insulation layer 120 may include a multi-layer structure having materials different from each other.

The semiconductor layer 131 and the ohmic contact layer 132 are formed on the gate insulation layer 120 by a chemical vapor deposition process. The semiconductor layer 131 may include, for example, amorphous silicon. The ohmic contact layer 132 may include, for example, amorphous silicon doped with n type impurities with a high concentration.

A second photoresist pattern PR2 is formed on the ohmic contact layer 132 through a photolithography process by using a second mask MASK2. The active layer A overlapping the gate electrode G is formed by patterning the ohmic contact layer 132 and the semiconductor layer 131 through an etching process by using the second photoresist pattern PR2. The second photoresist pattern PR2 can be removed by a stripping process after the etching process was performed to form the active layer A.

Referring to FIGS. 1 to 5, a conductive material layer CL is formed on the base substrate 110 where the active layer A is formed. The conductive material layer CL may include a transparent conductive material, such as, for example, indium tin oxide, indium zinc oxide, or amorphous indium tin oxide. The conductive material layer CL may be formed through a sputtering process.

A photoresist layer is coated on the conductive material layer CL. In an exemplary embodiment, the photoresist layer may a positive type photoresist. An exposed area of the positive type photoresist can be dissolved by a developing agent. A third photoresist pattern PR 3 is formed by exposing and developing the photoresist layer with a third mask MASK3 including a light blocking portion 2, a light transmission portion 4, and a light diffraction portion 6.

The third photoresist pattern PR3 includes a first pattern portion P1 having a first thickness t1, a second pattern portion P2 having a second thickness t2 which is about a half of the first thickness t1, and an opening pattern OA exposing the conductive material layer CL. The first pattern portion P1 is an area patterned by the light blocking portion 2. The opening pattern OA is an area patterned by the light transmission portion 4. The second pattern portion P2 is an area patterned by the light diffraction portion 6 which transmits an amount of light less than the light transmission portion 4. The third mask MASK3 may be a slit mask including a slit pattern corresponding to the light diffraction portion 6, or a halftone mask including a halftone layer corresponding to the light diffraction portion 6.

The conductive material layer CL corresponding to the opening pattern OA and the gate insulation layer 120 are etched through an etching process using the third photoresist pattern PR3, so that the hole H is formed to expose a portion of the signal line STL in the unit pixel P. The gate pad hole GH to expose an end portion of the gate line GL and the signal pad hole SH to expose an end portion of the signal line STL are formed.

Figure 5:
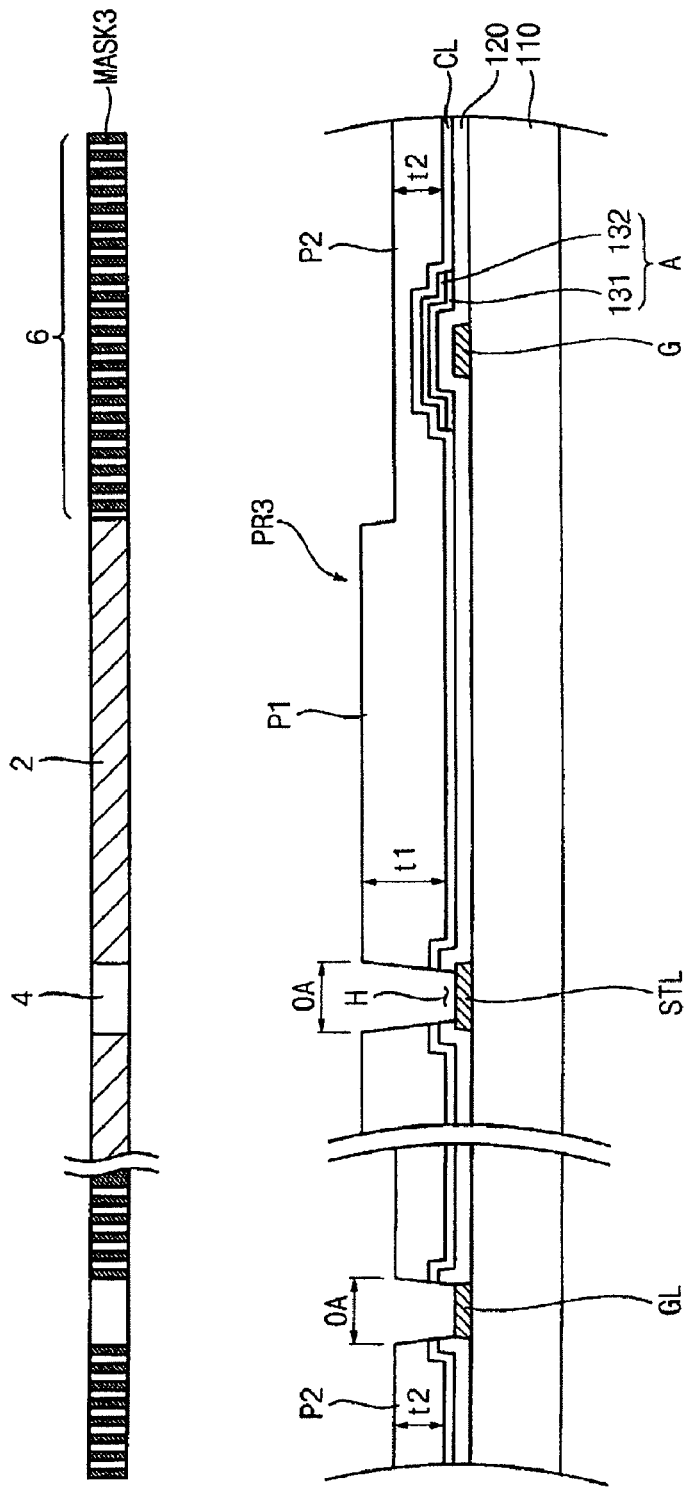
Figure 6:
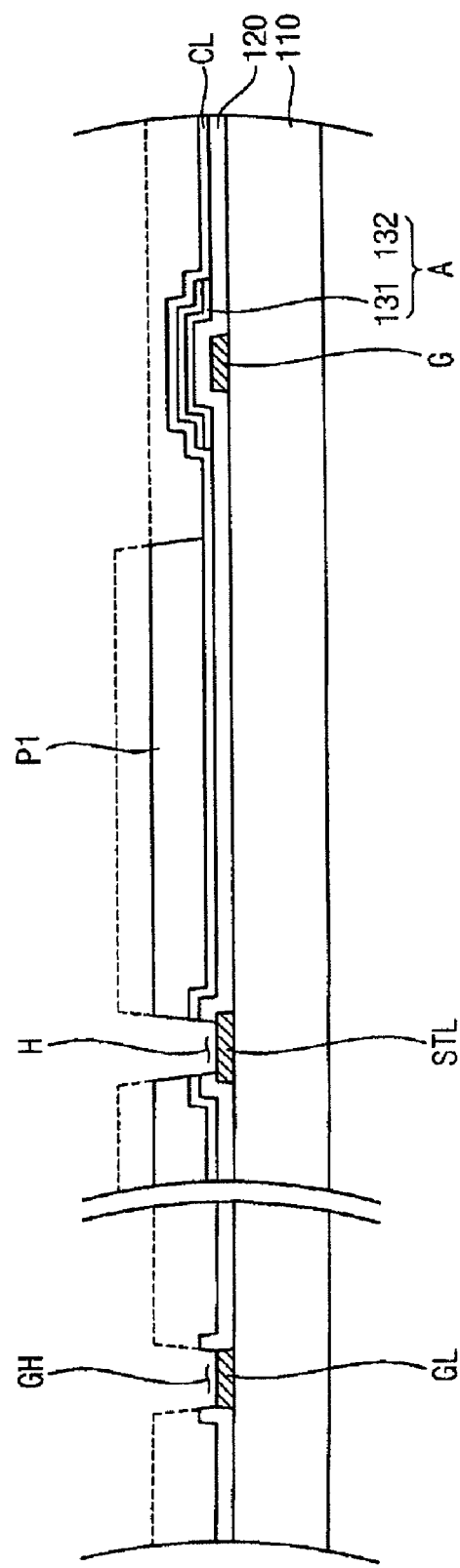

Referring to FIGS. 1, 5 and 6, an ashing process is performed to etch a predetermined thickness of the third photoresist pattern PR3. In an exemplary embodiment, the third photoresist pattern PR3 is etched by a thickness which is thicker than that of the second thickness t2, so that the second pattern portion P2 is removed. The first pattern portion P1 with a predetermined thickness remains on the base substrate 110.

The conductive material layer CL is etched by using the remaining first pattern portion P1 as a mask.

Figure 7:
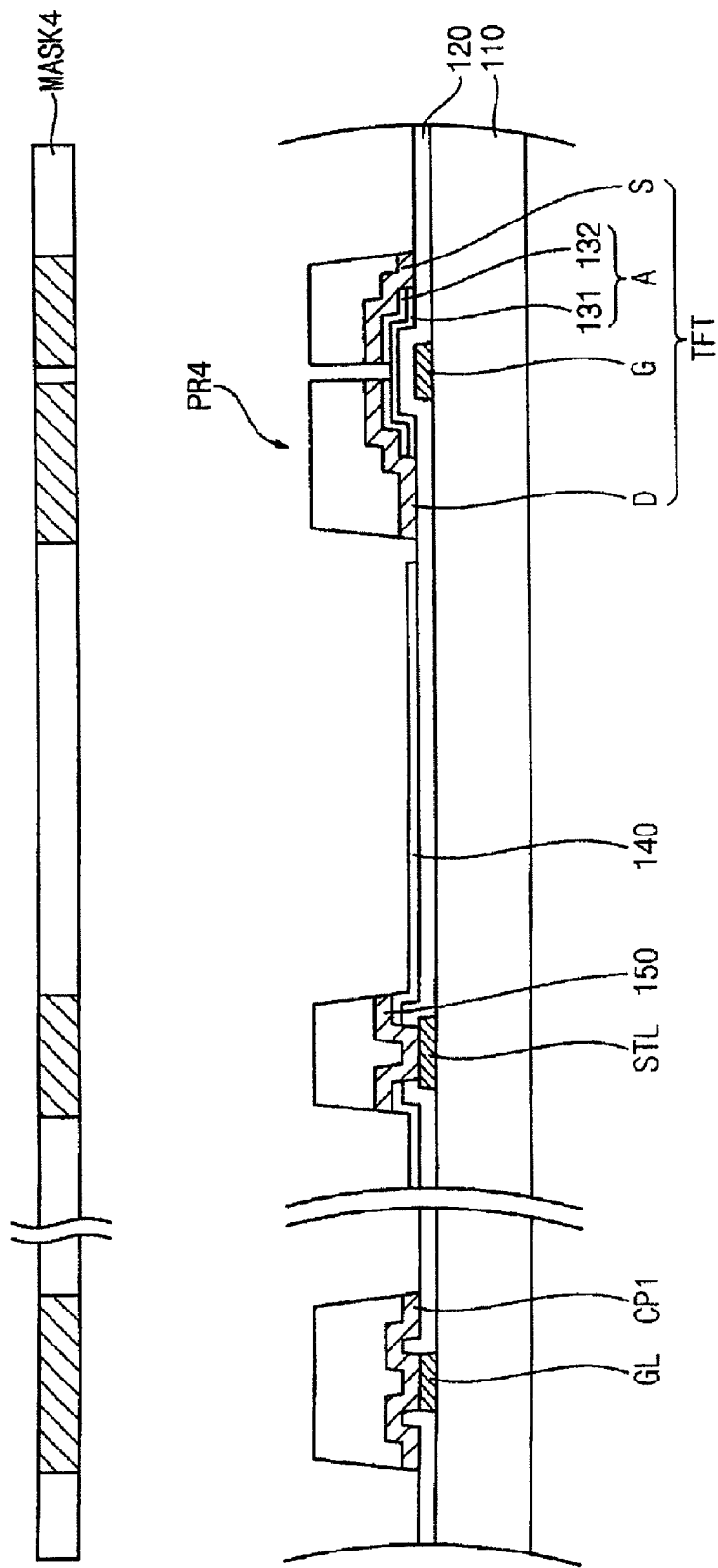

Referring to FIGS. 1 and 7, the first electrode 140 corresponds to each of the unit pixel P. The first electrode 140 includes the hole H to expose the signal line STL.

The first pattern portion P1 remaining on the first electrode 140 is removed through a stripping process after an etching process was performed to form the first electrode 140.

A second metal layer (not shown) is formed on the base substrate 110 where the first electrode 140 is formed. The second metal layer may include, for example, chromium, aluminum, tantalum, molybdenum, titanium, tungsten, copper, silver or a combination thereof. The second metal layer may include a multi-layer structure wherein each layer has physical properties different from each other.

A photoresist layer (not shown) is coated on the second metal layer. A fourth photoresist pattern PR4 is formed by patterning the photoresist layer through a photolithography process by using a fourth mask MASK4. A second metal pattern including the data lines DL, the source electrode S, the drain electrode D and the connecting electrode 150 is formed by patterning a second metal layer (not shown) through an etching process by using the fourth photoresist pattern PR4.

The source electrode S is protruded from the data line DL and overlaps a portion of the active layer A. The drain electrode D is spaced apart from the source electrode S by a predetermined distance and overlaps a portion of the active layer A.

The connecting electrode 150 corresponds to the hole H. In an exemplary embodiment, the first connecting electrode 150 may have an area larger than the hole H. The connecting electrode 150 is connected to the signal line STL and the first electrode 140. The signal line STL is electrically connected to the first electrode 140 so that a common voltage is applied to the first electrode 140.

According to exemplary embodiments of the present invention, the photoresist pattern PR3 is formed by using a mask, for example, a slit mask or a halftone mask that can control an amount of exposure. Thus, the hole H and the first electrode 140 can be patterned through photolithography-etching processes by using one mask. When the second metal pattern is patterned, the signal line STL can be electrically connected to the first electrode 140 by forming the connecting electrode 150.

The second metal pattern may further include the covering pattern CP1 to cover the gate pad hole GH or the signal pad hole SH.

The ohmic contact layer 132 exposed between the source electrode S and the drain electrode D is etched through an etching process by using the second metal pattern and the fourth photoresist pattern PR4 as a mask. The TFT including the gate electrode G, the active layer A, the source electrode S and the drain electrode D is formed in the unit pixel P.

Figure 8:
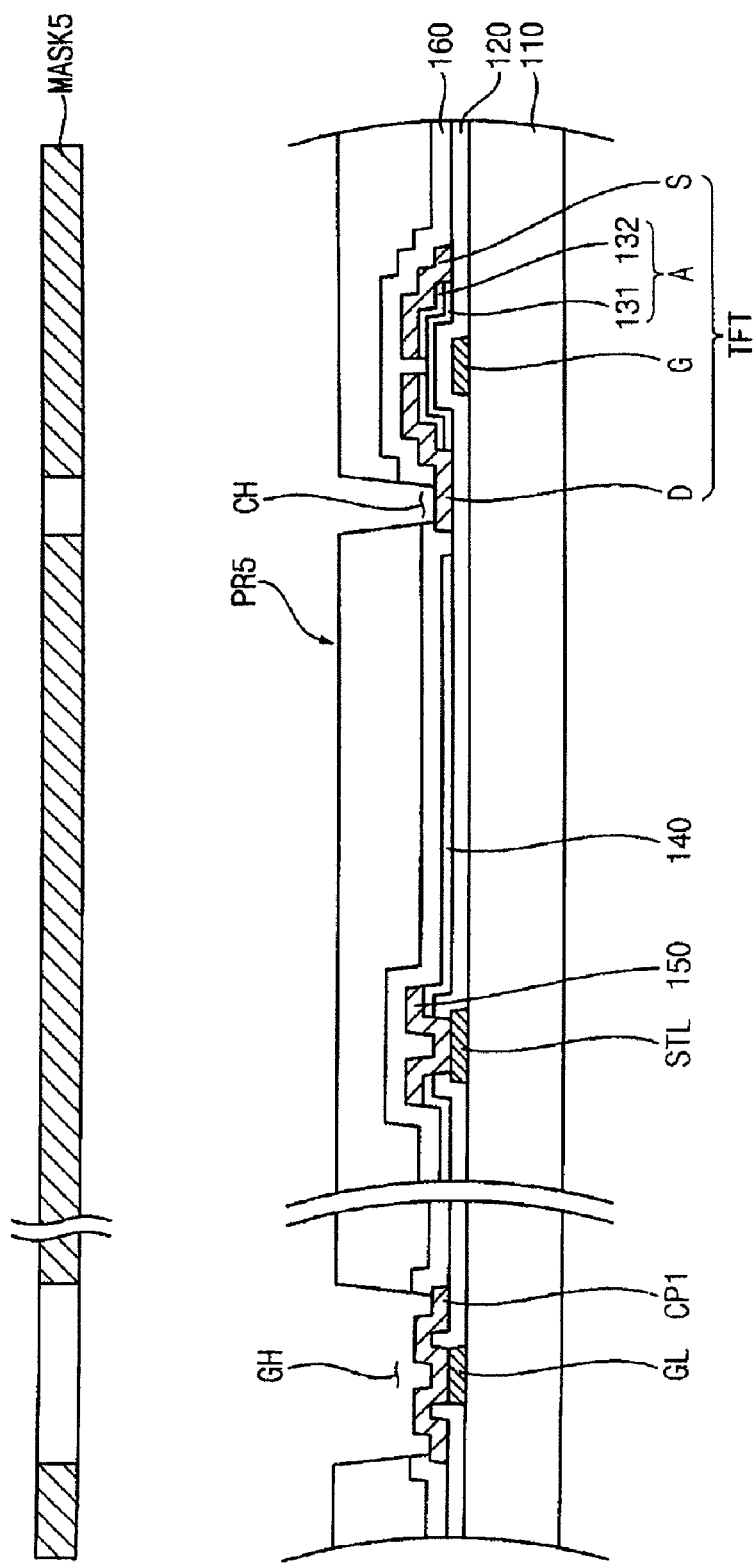

Referring to FIGS. 1 and 8, the passivation layer 160 is formed on the base substrate 110 where the TFT is formed. The passivation layer 160 may include, for example, silicon nitride (SiNx), silicon oxide (SiOx) or an organic material. The passivation layer 160 can be formed through a chemical vapor deposition process.

A photoresist layer is coated on the passivation layer 160. A fifth photoresist pattern PR5 is formed by patterning the photoresist layer through a photolithography process by using a fifth mask MASK5.

The passivation layer 160 is patterned through an etching process by using the fifth photoresist pattern PR5, so that the contact hole CH to expose an end portion of the drain electrode D and the pad holes PHs corresponding to end portions of the gate line GH, the data line DL and the signal line STL, respectively.

When the passivation layer 160 is formed by the organic material, a developed photosensitive photoresist layer can be used as a protection layer.

Figure 9:
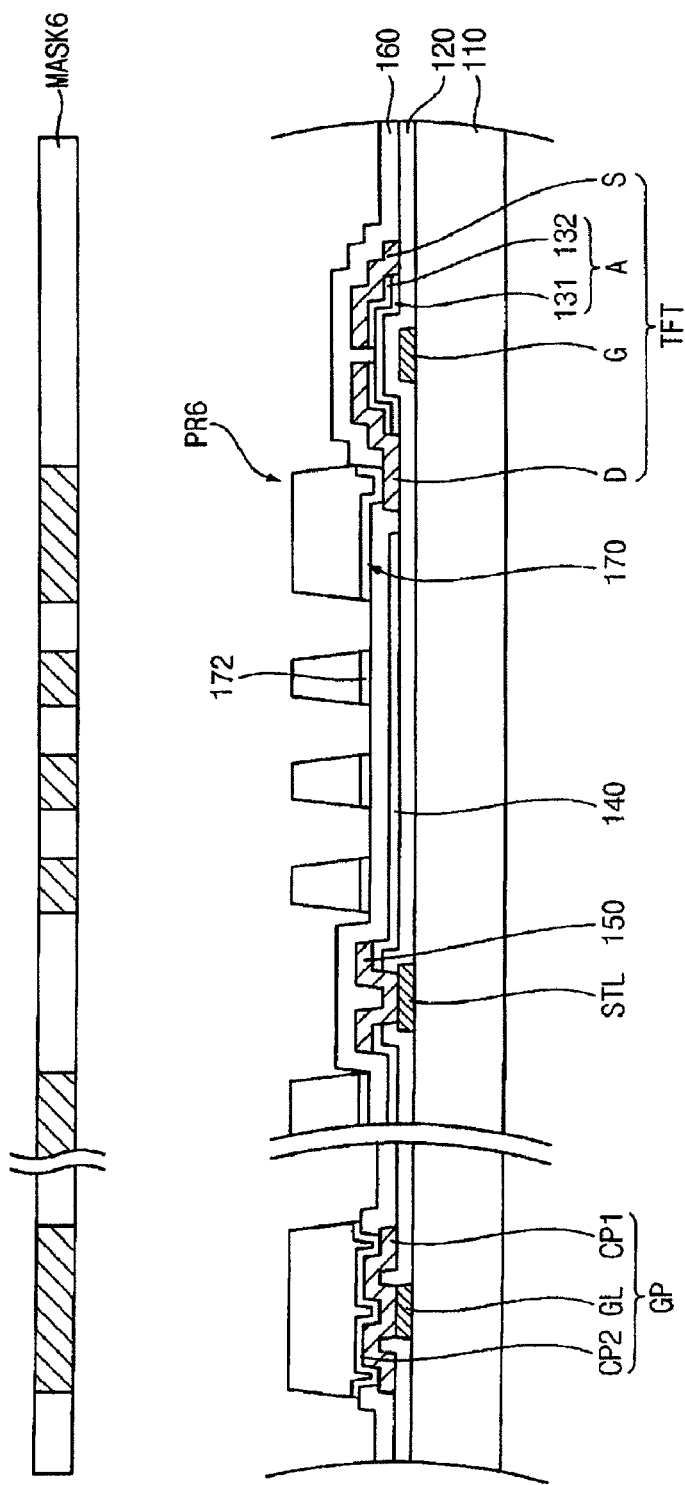

Referring to FIGS. 1 and 9, a transparent conductive layer (not shown) is formed on the passivation layer 160. The transparent conductive layer may include, for example, indium tin oxide, indium zinc oxide or amorphous indium tin oxide. The transparent conductive layer can be formed through a sputtering process.

The second electrode 170 corresponding to the unit pixel P is formed by patterning the transparent electrode layer through photolithography-etching processes using a sixth mask MASK6.

The second electrode 170 may include the slit patterns 173 spaced apart from each other by substantially the same distance to form a fringe field with the first electrode 140. In an exemplary embodiment, the second electrode 170 may include a first line 171 extended in a third direction at the unit pixel P, and a plurality of second lines 172 protruding from the first line 171 and substantially uniformly spaced apart from each other by the slit pattern 173. The third direction may be the same as the first direction X or the second direction Y.

The second lines 172 protruding from the first line 171 may extend at a substantially right angle with respect to the first line 171. Alternatively, the second lines 172 form an acute angle or an obtuse angle with respect to the first line 171.

When the lithography-etching processes are performed, a second covering pattern CP2 can be formed.

According to exemplary embodiments of the present invention, the hole H exposing the signal line STL and the first electrode are patterned by using one mask. The connecting electrode connects the signal line STL and the first electrode 140 is formed from the second metal pattern. Thus, processes for manufacturing the display substrate can be simplified so that manufacturing time and costs can be reduced.

Although the illustrative embodiments of the present invention have been described herein with reference to the accompanying drawings, it is to be understood that the present invention should not be limited to those precise embodiments and that various other changes and modifications may be affected therein by one of ordinary skill in the related art without departing from the scope or spirit of the invention. All such changes and modifications are intended to be included within the scope of the invention as defined by the appended claims.

What is claimed is:

1. A display substrate comprising:
   a first metal pattern including a gate electrode, a gate line and a signal line;
   a first insulation layer formed on a substrate where the first metal pattern is formed, wherein the first insulation layer includes a first opening portion exposing a portion of the signal line;
   a first electrode formed on the first insulation layer, wherein the first electrode corresponds to a unit pixel; and
   a second metal pattern including a connecting electrode and a data line, wherein the connecting electrode is connected to the first electrode and the signal line through the first opening portion,
   wherein the first insulation layer covers an entire portion between the gate electrode and the first opening portion, and
   wherein the connecting electrode contacts the first electrode on opposite sides of the signal line with respect to a lengthwise center-line of the signal line.

2. The display substrate of claim 1, wherein the first electrode comprises a transparent conductive material.

3. The display substrate of claim 1, further comprising:
   a second insulation layer formed on the substrate where the second metal pattern is formed; and
   a second electrode formed on the second insulation layer, wherein the second electrode corresponds to the unit pixel.

4. The display substrate of claim 3, wherein the first electrode and the second electrode generate a fringe field.

5. The display substrate of claim 3, wherein the second electrode comprises a transparent conductive material.

6. The display substrate of claim 3, further comprising a thin film transistor (TFT) formed in the unit pixel, wherein the TFT comprises:
   the gate electrode protruded from the gate line;
   a source electrode protruded from the data line, wherein the source electrode overlaps a portion of the gate electrode;
   a drain electrode spaced apart from the source electrode, wherein the drain electrode includes the second metal pattern; and
   an active layer formed between the second metal pattern and the first insulation layer, wherein the active layer overlaps the gate electrode.

7. The display substrate of claim 6, wherein the second insulation layer comprises a contact hole exposing an end portion of the drain electrode and the second electrode is connected to the drain electrode through the contact hole.

8. The display substrate of claim 1, wherein longer sides of the connecting electrode extend parallel to an extension direction of the signal line in a plan view, and edges of the longer sides of the connecting electrode overlapping and contacting the first electrode extend beyond corresponding edges of the signal line.

9. The display substrate of claim 1, wherein the signal line passes through a center portion of the unit pixel.

10. A display substrate comprising:
    a first metal pattern including a gate electrode, a gate line and a signal line;
    a first insulation layer formed on a substrate where the first metal pattern is formed,
    wherein the first insulation layer includes a first opening portion exposing a portion of the signal line;
    a first electrode formed on the first insulation layer and corresponding to a unit pixel, wherein the first electrode comprises a second opening portion corresponding to the first opening portion; and
    a second metal pattern including a connecting electrode and a data line, the connecting electrode formed on the first electrode and corresponding to the second opening portion, wherein the connecting electrode is connected to the first electrode and the signal line,
    wherein the first insulation layer covers an entire portion between the gate electrode and the first opening portion, and
    wherein the connecting electrode contacts the first electrode on opposite sides of the signal line with respect to a lengthwise center-line of the signal line.

11. The display substrate of claim 10, wherein the first electrode comprises a transparent conductive material.

12. The display substrate of claim 10, further comprising:
    a second insulation layer formed on the substrate where the second metal pattern is formed; and
    a second electrode formed on the second insulation layer, wherein the second electrode corresponds to the unit pixel.

13. The display substrate of claim 12, wherein the first electrode and the second electrode generate a fringe field.

14. The display substrate of claim 12, wherein the second electrode comprises a transparent conductive material.

15. The display substrate of claim 12, further comprising a thin film transistor (TFT) formed in the unit pixel, wherein the TFT comprises:
    the gate electrode protruded from the gate line;
    a source electrode protruded from the data line, wherein the source electrode overlaps a portion of the gate electrode;
    a drain electrode spaced apart from the source electrode, wherein the drain electrode includes the second metal pattern; and
    an active layer formed between the second metal pattern and the first insulation layer, wherein the active layer overlaps the gate electrode.

16. The display substrate of claim 15, wherein the second insulation layer comprises a contact hole exposing an end portion of the drain electrode and the second electrode is connected to the drain electrode through the contact hole.

17. The display substrate of claim 10, wherein longer sides of the connecting electrode extend parallel to an extension direction of the signal line in a plan view, and edges of the longer sides of the connecting electrode overlapping and contacting the first electrode extend beyond corresponding edges of the signal line.

18. The display substrate of claim 10, wherein the signal line passes through a center portion of the unit pixel.

19. A display substrate comprising:
    a first metal pattern including a gate electrode, a gate line and a signal line;
    a first insulation layer formed on a substrate where the first metal pattern is formed, wherein the first insulation layer includes a first opening portion exposing a portion of the signal line;
    a first electrode formed on the first insulation layer, wherein the first electrode corresponds to a unit pixel;

a second metal pattern including a connecting electrode and a data line, wherein the connecting electrode is connected to the first electrode and the signal line through the first opening portion;
a second insulation layer formed on the substrate where the second metal pattern is formed;
a second electrode formed on the second insulation layer, wherein the second electrode corresponds to the unit pixel, and wherein the connecting electrode contacts the first electrode on opposite sides of the signal line with respect to a lengthwise center-line of the signal line; and
a thin film transistor (TFT) formed in the unit pixel, wherein the TFT comprises:
a gate electrode protruded from the gate line;
a source electrode protruded from the data line, wherein the source electrode overlaps a portion of the gate electrode;
a drain electrode spaced apart from the source electrode, wherein the drain electrode includes the second metal pattern; and
an active layer formed between the second metal pattern and the first insulation layer, wherein the active layer overlaps the gate electrode, and
the source electrode and the drain electrode make contact with an upper surface of the first insulation layer.

20. A method of manufacturing a display substrate, the method comprising:
forming a first metal pattern including a gate electrode, a gate line and a signal line on a substrate;
forming a first insulation layer and a conductive layer on the substrate where the first metal pattern is formed;
forming an opening portion exposing a portion of the signal line in a unit pixel by firstly etching the conductive layer and the first insulation layer;
forming a first electrode corresponding to the unit pixel by secondly etching the conductive layer after the opening portion is formed;
forming a second metal pattern corresponding to the opening portion, wherein the second metal pattern comprises a data line and a connecting electrode, the connecting electrode connected to the signal line and the first electrode;
forming a second insulation layer on the substrate where the second metal pattern is formed; and
forming a second electrode on the second insulation layer, wherein the second electrode corresponds to the unit pixel,
wherein the first insulation layer covers an entire portion between the gate electrode and the first opening portion.

21. The method of claim 20, wherein forming the opening portion comprises:
forming a photoresist layer on the conductive layer;
forming a photoresist pattern including:
a first pattern portion;
a second pattern portion having a thickness thinner than a thickness of the first pattern portion; and
an opening pattern formed by patterning the photoresist layer; and
etching the conductive layer corresponding to the opening pattern and the first insulation layer by using the photoresist pattern.

22. The method of claim 21, wherein forming the first electrode comprises:
removing the second pattern portion by etching a portion of the photoresist pattern; and
etching the conductive layer including an opening area exposed through removing the second pattern portion.

23. The method of claim 22, wherein etching the conductive layer is performed through a wet etching process by using an etching agent having an etching selectivity ratio of the first metal pattern.

24. The method of claim 23, further comprising etching a portion of the active layer exposed between the source electrode and the drain electrode by a predetermined distance.

25. The method of claim 24, further comprising forming a contact hole exposing a portion of the drain electrode by patterning the second insulation layer.

26. The method of claim 20, further comprising forming a TFT in the unit pixel, wherein forming the TFT comprises:
forming the gate electrode protruded from the gate line by patterning the first metal pattern;
forming an active layer on the first insulation layer, wherein the active layer overlaps the gate electrode;
forming a source electrode overlapping a portion of the active layer by patterning the second metal pattern; and
forming a drain electrode spaced apart from the source electrode, wherein the drain electrode overlaps a portion of the gate electrode.

27. The method of claim 20, wherein forming the second electrode comprises:
forming a conductive layer on the second insulation layer; and
patterning the conductive layer to form the second electrode including a plurality of first lines extended in a direction which is the same as an extended direction of the data line and connected to the drain electrode through the contact hole, and a plurality of second lines extended in a direction which is the same as an extended direction of the gate line and connected to the first lines.

28. The method of claim 20, wherein forming the opening portion comprises forming a gate pad hole exposing a portion of the gate line.

29. The method of claim 28, wherein forming the second metal pattern comprises forming a covering pattern covering the gate pad hole.

30. The method of claim 20, wherein the conductive layer and/or the second electrode comprise a transparent conductive material.

31. The method of claim 20, wherein longer sides of the connecting electrode extend parallel to an extension direction of the signal line in a plan view, and edges of the longer sides of the connecting electrode overlapping and contacting the first electrode extend beyond corresponding edges of the signal line.

32. The method of claim 20, wherein the signal line passes through a center portion of the unit pixel.

* * * * *